United States Patent

[11] 3,612,764

[72] Inventors David C. Gilkeson
North Oaks;
Patrick R. Novak, Mounds View, both of Minn.

[21] Appl. No. 876,710
[22] Filed Nov. 14, 1969
[45] Patented Oct. 12, 1971
[73] Assignee Minnesota Mining & Manufacturing Company
St. Paul, Minn.

[54] TELEVISION SECURITY MONITOR
3 Claims, 4 Drawing Figs.

[52] U.S. Cl. .......... 178/7.88, 178/DIG. 1, 179/2 CA, 340/149
[51] Int. Cl. .......... H01j 29/89
[50] Field of Search .......... 178/7.88, 7.92, 7.89, 2 CA, DIG. 1, DIG. 23; 95/1.1; 340/149

[56] References Cited

UNITED STATES PATENTS

| | | | |
|---|---|---|---|
| 2,481,083 | 9/1949 | Chew | 178/7.92 |
| 2,914,746 | 11/1959 | James | 340/149 |
| 2,935,559 | 5/1960 | Dornier | 178/6.8 |

*Primary Examiner*—Robert L. Griffin
*Assistant Examiner*—Richard K. Eckert, Jr.
*Attorney*—Kinney, Alexander, Sell, Steldt & Delahunt

ABSTRACT: Apparatus comprising in combination a TV monitor and a closed circuit TV camera including a wide angle lens for receiving and focusing a wide angle image of a first subject matter onto a photosensitive surface of the TV camera and including a telephotolens and a periscopic prism for receiving and focusing an enlarged image of a second subject matter, located substantially the same distance from the TV camera as the first subject matter, onto the photosensitive surface of the TV camera.

INVENTORS
DAVID C. GILKESON
PATRICK R. NOVAK
BY Kinney, Alexander, Sell, Steldt & DeLaHunt
ATTORNEYS INVENTORS
DAVID C. GILKESON
PATRICK R. NOVAK
BY Kinney, Alexander,
Sell, Steldt & DeLaHunt
ATTORNEYS

TELEVISION SECURITY MONITOR

BACKGROUND OF THE INVENTION

In certain working situations, such as research and development contracts with the Atomic Energy Commission, very strict security measures are necessary. Under such conditions, specific areas have to operate within security measures whereby each entryway has to be under constant surveillance and each person desiring entry into such areas has to be specifically identified against his identification card. At each entryway where such security has to be strictly maintained, a guard could be placed to view each person desiring entry and to closely examine the person's identification card; however, this would be economically prohibitive when many such entryways are involved. A television camera with a wide angle lens system to view the entire entry area could be used to provide surveillance of each entryway. In addition to viewing any person entering or leaving the doorway it is, of course, necessary to view the person's identification card to show that he has been previously cleared to enter the area. Thus, a second TV camera located immediately adjacent to each entryway to view the person's identification card is required. Therefore, such strict surveillance necessitates and the prior art utilizes two TV cameras wherein one camera monitors the entry area and a second camera views the person's identification card. If a single camera could be modified to perform as two separate cameras, then, at least, one TV camera for each entryway could be eliminated at substantial economical savings.

SUMMARY OF THE INVENTION

The present invention relates to a security monitor for providing surveillance of an entryway and identification of a person desiring passage through the entryway, by utilizing a single TV camera, and more particularly to a closed circuit TV camera having a photosensitive surface and including a first lens means for receiving and focusing a wide angle image of a first subject matter onto the photosensitive surface and a second lens means for receiving and focusing an enlarged image of a second subject matter, located at substantially the same distance from the TV camera as the first subject matter, onto the photosensitive surface of the TV camera.

The apparatus of the present invention provides a more economical and simplified concept of providing total surveillance of an entryway. A TV camera with a wide angle lens views the entire entryway to prevent any undetected and unauthorized passage through the entryway. Such surveillance is reproduced on the viewing screen of a TV monitor. The TV camera also includes a telephotolens to provide an enlarged image of a person's identification card which enlarged image is simultaneously reproduced with the wide angle image on the viewing screen. Such identification cards commonly include the person's photograph and the telephotolens of the present apparatus provides an enlarged image of such a photograph, on the TV monitor, wherein the size of the person within the photograph is substantially the same size as the person standing in the entryway. This enlarged image, wherein any writing on the identification card is clearly discernible and wherein the photograph corresponds in size to person standing in the entryway, greatly facilitates identification of the person against his identification card. A periscopic prism enables both the wide angle lens and the telephotolens to be adjacently located on the front plate of the TV camera. Also, the periscopic prism directs the enlarged image to the vidicon tube of the TV camera and thereby enables the utilization of a single TV camera to simultaneously receive the wide angle image and the telephoto image. An auxiliary light, over the identification card support, balances the intensity of the telephoto image against the intensity of the wide angle image as both are received on the photosensitive surface of the vidicon tube. This balance of intensity at the vidicon tube provides a balance of intensities on the viewing screen of the TV monitor. These and other advantages of the present invention will be readily apparent from consideration of the following specification relating to the annexed drawing in which:

Figures 1, 4:
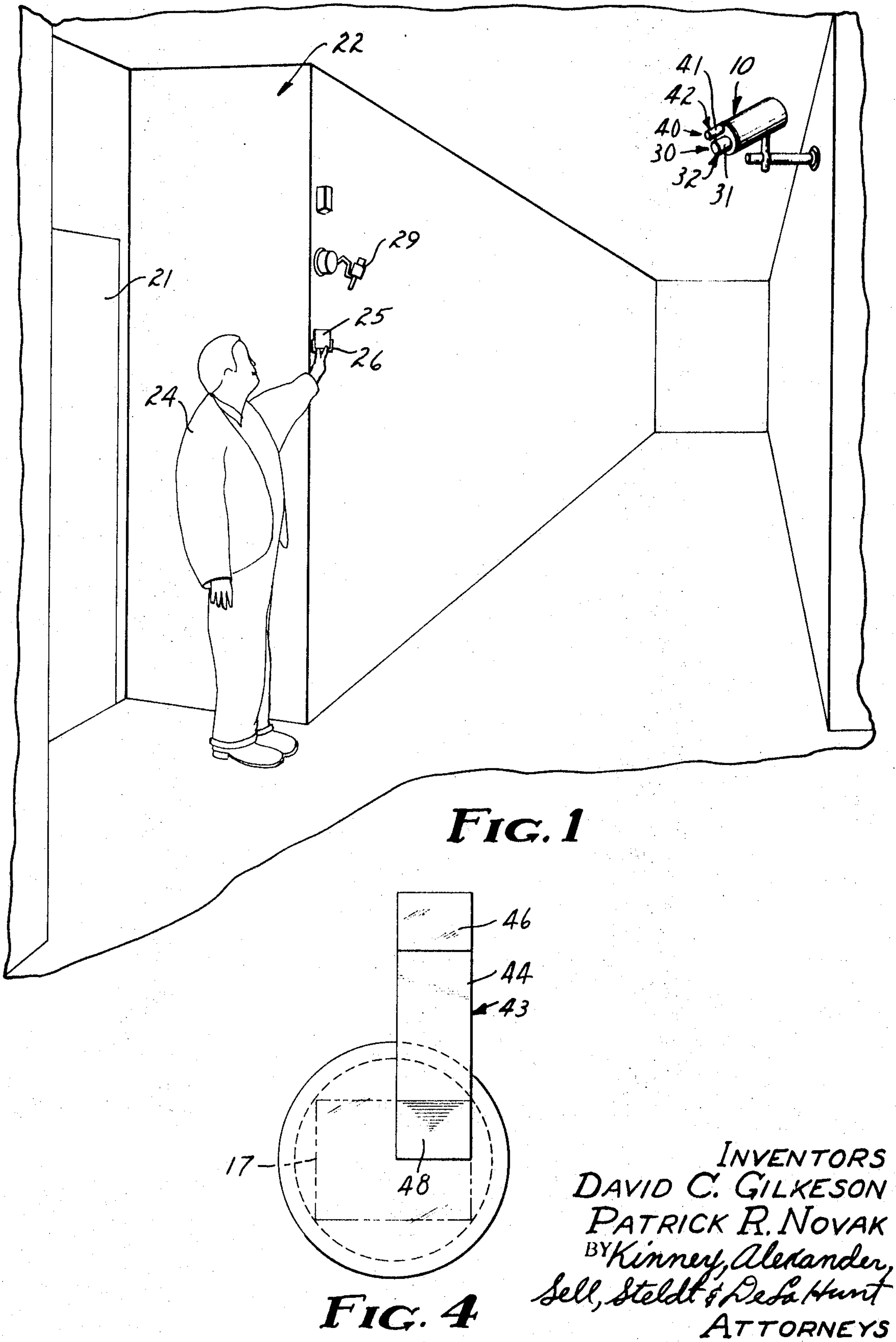
FIG. 1 is a perspective view of a person desiring passage through an entryway.
FIG. 4 is a cross-sectional view taken along lines 4—4 of FIG. 3 illustrating the positioning of the periscopic prism on the front face of the vidicon tube.
Figures 2, 3:
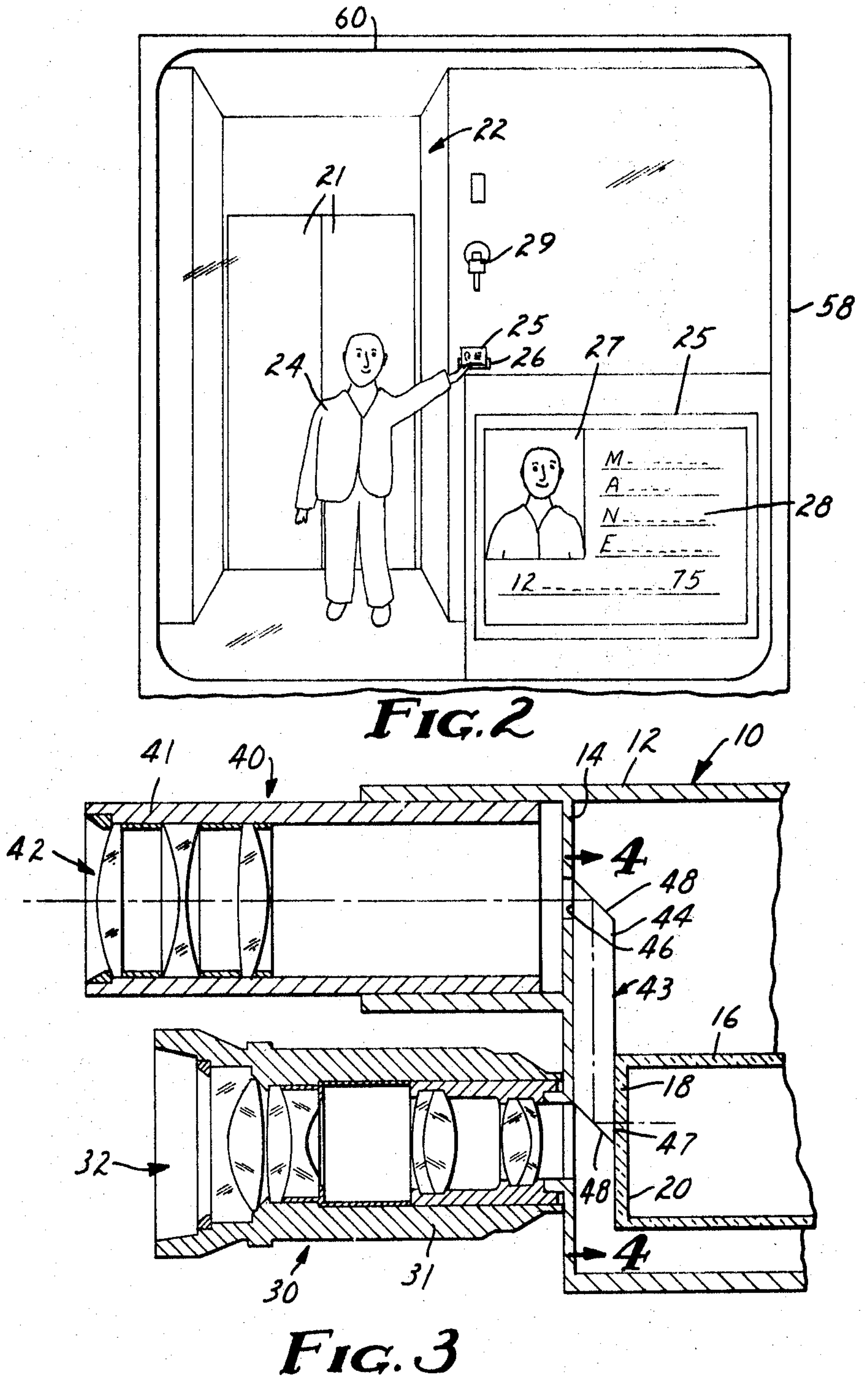
FIG. 2 illustrates the two images appearing on the TV monitor.
FIG. 3 is a side view, partly in section, of the wide angle lens, the telephotolens including a periscopic prism, and the vidicon tube of the TV camera.

Referring now to the embodiment illustrated in the drawings, wherein like reference characters designate like or corresponding parts throughout the several views, there is shown in Fig. 1 a closed circuit TV camera 10 for providing a TV signal of two received images which are further received by a viewing means 58, which may be a TV monitor, and reproduced on a viewing screen 60 as illustrated in Fig. 2. The TV camera 10, as shown in Fig. 3, includes a housing 12 having an apertured front plate 14; a vidicon tube 16 including a glass front face 18 with an inner photosensitive surface 20; electrical components (not shown) for converting the image received on the photosensitive surface 20 to a TV signal; a first lens means 30 having a first focal length for receiving a wide angle image of a first subject matter which is illustrated in this application as including the entryway 22 and the person 24 desiring passage through the entryway 22; and a second lens means 40 having a second focal length for receiving and focusing an enlarged image of a second subject matter, in this instance illustrated as an identification card (ID) 25 of the person 24 desiring passage through the entryway 22.

The first lens means 30, as shown in Fig. 3, includes a lens support 31 and a wide angle lens 32 for receiving and focusing a wide angle image through the glass 18 front face of the vidicon tube 16 onto the photosensitive surface 20. The first subject matter, as shown in Figs. 1 and 2, includes the entire entryway 22 and any subject therein, such as a person 24 desiring passage through the doorway. The wide angle lens 32, of the illustrated embodiment, is a ½-inch f./1.2 camera lens, commonly used with a 16 mm. motion picture camera or a closed circuit television camera.

The second lens means 40, as shown in Fig. 3, includes a lens support 41 secured to the front plate 14, a telephotolens 42 and periscopic means 43 for receiving and focusing an enlarged image of a second subject matter, located at substantially the same distance from the TV camera 10 as the first subject matter, onto the photosensitive surface 20 of the vidicon tube 16. The telephotolens 42, which is directed to view the I.D. support 26 shown in Figs. 1 and 2, is displaced at a small angle relative to the axis of the wide angle lens 32 which is directed to view the entire entryway 22. The telephotolens 42, of the illustrated embodiment, is a 5 inch f./3.5 triplet-type camera lens. As shown in Fig. 4, the vidicon tube 16 has an effective photosensitive area as outlined by the dotted line 17. The periscopic means 43 which could comprise fiber optics, or other means directing the light to the vidicon tube, is illustrated in the present embodiment as an elongated optical means including a periscopic prism 44. The periscopic prism 44, which is of a good grade optical glass to transmit a good image, includes polished entrance and exit faces 46, 47, respectively, and polished reflecting surfaces 48, 48. Except for the entrance and exit faces 46, 47 the exterior of the prism 44 is blackened to absorb any incidental light and thus increase the contrast of the transmitted image. The reflecting surfaces 48, 48 which could be aluminized or silvered to obtain a high degree of reflectivity, function to reflect the enlarged image through the prism.

The focal length selection of the telephoto and wide angle lenses is entirely dependent on the subject distance and the area desired to be viewed. Thus, a different combination of focal lengths for different distances and areas could be readily substituted for the focal lengths illustrated in the present embodiment.

The dissimilar f./numbers of the wide angle lens 32 and the telephotolens 42 require the addition of an auxiliary light 29 over the identification card support 26, as shown in Figs. 1 and 2, to equalize the actinic illumination of the telephoto image and the wide angle image as each are received at the photosensitive surface 20 of the vidicon tube 16. The received actinic illumination could also be balanced by equating the f./number of the wide angle lens with the f./number of the telephotolens.

In operation, a person 24 desiring passage through a secured entryway 22, positions himself in the entryway 22 and places his I.D. card 25 on the I.D. support 26 which actuates an alarm (not shown) to notify a guard at a remote location that a person desires passage through the doors 21. While the person is facing the TV camera 10, the guard viewing the viewing screen 60 of the TV monitor compares the person 24 against the photograph 27 and the indicia 28 on the I.D. card 25. After the person 24 has been cleared by the guard, the guard electrically unlocks the doors 21 and the person is allowed to enter the secured area behind the doors 21. Throughout the identification procedure, the wide angle lens 32 maintains the entire entryway 22 under a real-time surveillance.

What is claimed is:

1. An apparatus for providing simultaneous surveillance of an entryway and identification of a person desiring passage through the entryway, said apparatus comprising in combination:

1. a TV camera for providing a TV signal of two simultaneously received separate images, said camera including a vidicon tube having a front face with an inner photosensitive surface;
2. first lens means secured to said TV camera and having a first focal length for imaging a wide field of view of a first subject matter such as an entryway onto a first area of said photosensitive surface;
3. second lens means secured to said TV camera and having a second focal length for imaging an enlarged image of a second subject matter such as an identification card located substantially the same distance from said camera as said first subject matter onto a second area of said photosensitive surface simultaneously with said first subject matter; and
4. viewing means remote from said TV camera and operatively connected to said TV camera for receiving said TV signal to provide a real-time image of said first subject matter simultaneously with said second subject matter.

2. The apparatus of claim 1 wherein said second lens means includes 1. periscopic means located adjacent to said front face for transmitting said enlarged image to said vidicon tube; and
2. a telephotolens, located adjacent to said periscopic means, for focusing said second subject matter through said periscopic means onto said photosensitive surface.

3. The apparatus of claim 2 wherein said periscopic means includes an elongated optical means having 1. an entrance face located adjacent to said telephotolens for receiving said enlarged image,
2. an exit face located adjacent to said tube face for transmitting said enlarged image to said vidicon tube, and
3. at least two internal surfaces for reflecting said enlarged image from said first surface to said second surface.